United States Patent [19]
Antonietti

[11] Patent Number: 5,824,737
[45] Date of Patent: Oct. 20, 1998

[54] PROCESS FOR THE PREPARATION OF AQUEOUS POLYMER DISPERSIONS, AQUEOUS POLYMER DISPERSIONS PREPARED BY THIS PROCESS AND THE USE OF THESE POLYMER DISPERSIONS

[75] Inventor: Markus Antonietti, Marburg, Germany

[73] Assignee: BASF Lacke + Farbem AG, Muenster-Hiltrup, Germany

[21] Appl. No.: 617,811

[22] PCT Filed: Sep. 8, 1994

[86] PCT No.: PCT/EP94/03014

§ 371 Date: Apr. 8, 1996

§ 102(e) Date: Apr. 8, 1996

[87] PCT Pub. No.: WO95/08578

PCT Pub. Date: Mar. 30, 1995

[30] Foreign Application Priority Data

Sep. 21, 1993 [DE] Germany .......................... 43 32 005.8

[51] Int. Cl.$^6$ ................................ C08K 3/02; A61K 6/00; C10M 105/08
[52] U.S. Cl. ..................... 524/707; 524/767; 524/774; 424/401; 252/32.5; 252/541; 514/78; 514/557

[58] Field of Search ........................ 424/401; 252/32.5, 252/541; 514/78, 557; 524/707, 767, 774

[56] References Cited

U.S. PATENT DOCUMENTS

| | | | |
|---|---|---|---|
| 4,432,968 | 2/1984 | Page et al. ................................ | 424/81 |
| 5,002,761 | 3/1991 | Mueller et al. ........................... | 424/70 |

*Primary Examiner*—Kriellion S. Morgan

[57] ABSTRACT

The invention relates to the use of a mixture of
- (a1) a naturally occurring, zwitterionic phosphatide or a mixture of naturally occurring zwitterionic phosphatides and
- (a2) cholic acid and/or a salt of cholic acid and/or deoxycholic acid and/or a salt of deoxycholic acid and/or ricinoleic acid and/or a salt of ricinoleic acid and/or oleic acid and/or a salt of oleic acid as an emulsifier for the preparation of aqueous polymer dispersions which can be prepared by free radical emulsion polymerization of monomers which can be polymerized by free radicals or mixtures of monomers which can be polymerized by free radicals.

10 Claims, No Drawings

PROCESS FOR THE PREPARATION OF AQUEOUS POLYMER DISPERSIONS, AQUEOUS POLYMER DISPERSIONS PREPARED BY THIS PROCESS AND THE USE OF THESE POLYMER DISPERSIONS

The invention relates to a process for the preparation of aqueous polymer dispersions in which (1) in a first working step, an emulsion is prepared from
  (A) an emulsifier or a mixture of emulsifiers,
  (B) a water-insoluble agent which forms free radicals or a mixture of water-insoluble agents which form free radicals
  (C) a monomer which can be polymerized by free radicals or a mixture of monomers which can be polymerized by free radicals and
  (D) water and (2) in a second working step, component (C) is polymerized.

The invention also relates to aqueous polymer dispersions which can be prepared by this process and to the use of these polymer dispersions for the production of particularly environment-friendly products, cosmetics, medicaments and medical diagnostic agents.

The process described above is known. Suitable choice of the emulsifiers allows preparation of aqueous polymer dispersions which comprise polymer particles having very small particle sizes (5 to 50 nm) and a narrow particle size distribution (cf., for example, Antonietti, M.; Bremser, W.; Muschenborn, D.; Rosenauer, C.; Schupp, B.; Schmidt, M.; *Macromolecules* 1991, 24, 6636). The enormous internal surface area of such polymer dispersions can be modified chemically in various ways and adapted to suit the desired intended use (cf., for example, Antonietti, M.; Lohmann, S.; von Niel, C.; *Macromolecules* 1992, 25, 1139).

The polymer dispersions prepared to date by the process described above unfortunately comprise toxic, cationic surfactants. The present invention is based on the object of providing a process for the preparation of aqueous polymer dispersions of the type described above, with which aqueous polymer dispersions which have this disadvantage only to a reduced extent or not at all can be prepared.

Surprisingly, it has been possible to achieve this object by providing a process of the type described above, which is characterized in that, as component (A), a mixture of (a1) a naturally occurring, zwitterionic phosphatide or a mixture of naturally occurring zwitterionic phosphatides and (a2) cholic acid and/or a salt of cholic acid and/or deoxycholic acid and/or a salt of deoxycholic acid and/or ricinoleic acid and/or a salt of ricinoleic acid and/or oleic acid and/or a salt of oleic acid is employed.

In principle, any naturally occurring, zwitterionic phosphatide or a mixture of naturally occurring zwitterionic phosphatides can be employed as component (a1). The class of naturally occurring substances employed as component (a1) includes fat-like triglycerides which contain two long-chain fatty acids and a phosphoric acid radical, onto which a base is also bonded. They occur in all animal and plant cells, above all in the brain, in the heart, in the liver, in egg yolk and in soybeans. Cephalin and lecithin are preferably employed as component (a1). Both cephalin and lecithin comprise a mixture of phosphatides which contain various saturated and unsaturated fatty acids, for example palmitic, stearic, oleic, linoleic and linolenic acid. Cephalin and lecithin can be assigned the chemical structures shown in structural formulae I and II, wherein R and R' in each case are a saturated or unsaturated fatty acid.

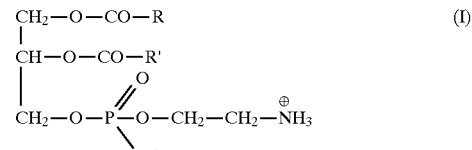

Cephalin

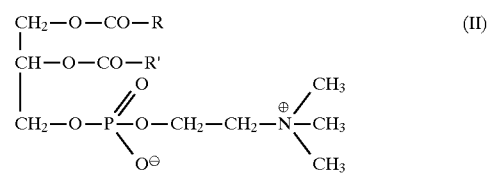

Lecithin

Lecithin is preferably employed as component (a1).

Cholic acid and/or a salt of cholic acid and/or deoxycholic acid and/or a salt of deoxycholic acid and/or ricinoleic acid and/or a salt of ricinoleic acid and/or oleic acid and/or a salt of oleic acid is employed as component (a2). The chemical structure of cholic acid and deoxycholic acid is shown in the structure formulae III and IV.

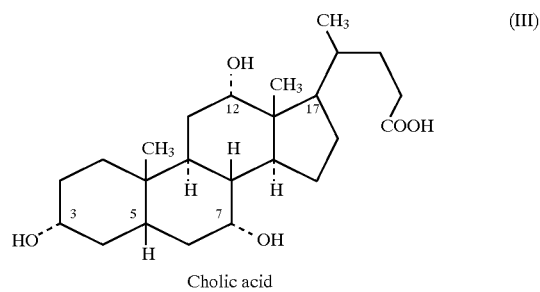

Cholic acid

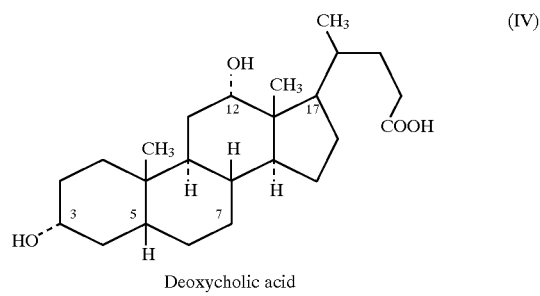

Deoxycholic acid

If salts of cholic acid, deoxycholic acid, ricinoleic acid or oleic acid are employed as component a2), salts which are physiologically tolerated (for example sodium salts) are preferably employed. A salt of cholic acid, particularly preferably the sodium salt of cholic acid, a salt of oleic acid, particularly preferably the sodium salt of oleic acid, or a mixture of a salt of cholic acid, in particular the sodium salt of cholic acid, and a salt of oleic acid, in particular the sodium salt of oleic acid, is preferably employed as component (a2).

Ricinoleic acid is another name for 12-hydroxyoleic acid. Component (A) employed according to the invention preferably comprises 5 to 95% by weight of component (a1) and 95 to 5% by weight of component (a2). A mixture of 15 to 50% by weight of lecithin and 85 to 50% by weight of the sodium salt of cholic acid or of the sodium salt of oleic acid or of a mixture of the sodium salt of cholic acid and the sodium salt of oleic acid is particularly preferably employed as component (A). If the sodium salt of oleic acid is employed as component (a2), the lecithin content of component (A) is particularly preferably adjusted to 25 to 35% by weight.

The invention also relates to the use of component (A) as an emulsifier for the preparation of aqueous polymer dispersions which can be prepared by free radical emulsion polymerization of monomers which can be polymerized by free radicals or mixtures of monomers which can be polymerized by free radicals.

In principle, any water-insoluble agent which forms free radicals which is suitable for the preparation of aqueous polymer dispersions or a mixture of water-insoluble agents which form free radicals can be employed as component (B). Examples which are mentioned of water-insoluble agents which form free radicals which can be employed are: azobis(isobutyronitrile), tert-butyl perethylhexanoate, benzoyl peroxide, tert-butyl peroctanoate, tert-butyl perbenzoate, 2,2'-azo-bis(2-cyanopropane) and 1,1'-azo-bis-cyclohexanecarbonitrile.

In principle, any monomer which can be polymerized by free radicals or a mixture of monomers which can be polymerized by free radicals can be employed as component (C). The choice of component (C) depends on the intended use of the polymer dispersion. If the polymer dispersions are to be used, for example, for the production of coatings, the monomers which can be polymerized by free radicals are to be chosen such that the coating films produced when the aqueous polymer dispersions according to the invention are used have the desired properties. The selection rules for choosing the monomers employed which are to be observed for production of high-quality coating films are well known to the expert and do not have to be discussed in more detail at this point. The same applies to the case where the polymer dispersions prepared according to the invention are to be employed for cosmetic or pharmaceutical purposes. When choosing the monomers which can be polymerized by free radicals, it should be ensured in particular that the macromolecules obtained after the polymerization contain the functional groups necessary for any subsequent chemical modifications, such as, for example, hydroxyl groups, amino groups, carboxyl groups, epoxide groups and the like. Examples of monomers which can be polymerized by free radicals which can be employed are:

(i) aliphatic or cycloaliphatic esters of acrylic acid or methacrylic acid or a mixture of such esters and
(ii) ethylenically unsaturated monomers which carry at least one hydroxyl group in the molecule, or a mixture of such monomers, and
(iii) ethylenically unsaturated monomers which carry at least one carboxyl group in the molecule, or a mixture of such monomers, and
(iv) other ethylenically unsaturated monomers which differ from (i), (ii) and (iii), or a mixture of such monomers, and
(v) polyunsaturated monomers, in particular ethylenically unsaturated monomers.

The abovementioned monomers are preferably employed as mixtures.

Monomers which can be employed as component (i) are, for example: cyclohexyl acrylate, cyclohexyl methacrylate, alkyl acrylates and alkyl methacrylates having up to 20 carbon atoms in the alkyl radical, such as, for example, methyl, ethyl, propyl, butyl, hexyl, ethylhexyl, stearyl and lauryl acrylate and methacrylate, or mixtures of these monomers.

Monomers which can be employed as component (ii) are, for example: hydroxyalkyl esters of acrylic acid, methacrylic acid or another a,β-ethylenically [sic] unsaturated carboxylic acid. These esters can be derived from an alkylene glycol which is esterified with the acid, or they can be obtained by reaction of the acid with an alkylene oxide. Monomers which are preferably employed as component (ii) are hydroxyalkyl esters of acrylic acid and methacrylic acid in which the hydroxyalkyl group contains up to 4 carbon atoms, or mixtures of these hydroxyalkyl esters. Examples which are mentioned of such hydroxyalkyl esters are 2-hydroxyethyl acrylate, 2-hydroxypropyl acrylate, 2-hydroxypropyl methacrylate, 3-hydroxypropyl acrylate, 3-hydroxypropyl methacrylate, 2-hydroxyethyl methacrylate, 3-hydroxybutyl acrylate or 4-hydroxybutyl (meth)acrylate. Corresponding esters of other unsaturated acids such as, for example, ethacrylic acid, crotonic acid and similar acids having up to about 6 carbon atoms per molecule can also be employed.

Acrylic acid and/or methacrylic acid are preferably employed as component (iii). However, other ethylenically unsaturated acids having up to 18 carbon atoms in the molecule can also be employed. Examples which are mentioned of such acids are ethacrylic acid, crotonic acid, maleic acid, fumaric acid, itaconic acid and unsaturated fatty acids, such as, for example, oleic acid or linoleic acid.

Monomers which can be employed as component (iv) are, for example: vinyl-aromatic hydrocarbons, such as styrene, a-alkylstyrene and vinyltoluene, acrylamide and methacrylamide and acrylonitrile and methacrylonitrile, or mixtures of these monomers.

Compounds which can be employed as component (v) are those which contain at least two double bonds which can be polymerized by free radicals in the molecule. Examples which are mentioned are: divinylbenzene, p-methyldivinylbenzene, o-nonyldivinyl-benzene, ethanediol di(meth)acrylate, 1,4-butanediol di(meth)acrylate, 1,6-hexanediol di(meth)acrylate, trimethylolpropane tri(meth)acrylate, pentaerythritol di(meth)acrylate, allyl methacrylate, diallyl phthalate, butanediol divinyl ether, divinylethyleneurea, divinylpropyleneurea, diallyl maleate and the like.

In the process according to the invention for the preparation of aqueous polymer dispersions, an emulsion is prepared from components (A), (B), (C) and (D), water, in a first working step, and component (C) is then polymerized in a second working step. The polymerization is carried out under generally well-known conditions by inducing component (B) to dissociate into free radicals by supplying energy, in particular by heating.

Components (A) and (C) are preferably employed in a weight ratio of 1:10 to 10:1, particularly preferably in a weight ratio of 1:3 to 5:1.

The aqueous polymer dispersions prepared by the process according to the invention are free from toxic, cationic surfactants and therefore allow the production of particularly environment-friendly products, for example coatings, and in particular are also suitable for the production of cosmetics, medicaments and medical diagnostic agents. Another important advantage of the polymer dispersions prepared according to the invention is that the polymer particles of the aqueous polymer dispersions prepared according to the invention have very small particle sizes (5 to 50 nm) and narrow particle size distributions. The enormous internal surface area of the polymer dispersions prepared by the process according to the invention can be modified chemically in various ways and adapted to suit the desired intended use. Thus, for example, biomolecules can be introduced into or onto the surfaces of the polymer particles. Active polymer/enzyme or polymer/antibody hybrid particles, for example, can be prepared in this manner. The modification of the polymer dispersions prepared by the process according to the invention can be carried out, for example, by adding (D) a biologically active substance or a mixture of biologically active substances either in stage (1) or after stage (2) has been carried out.

The invention is illustrated in more detail in the following Example. All the percentage and amounts data are to be understood as weight data, unless expressly stated otherwise.

5.0 g of lecithin (from chicken egg, 90%) are dispersed in 100 ml of distilled water at room temperature by means of a high-speed stirrer. After addition of 6 g of sodium cholate, 10.0 g of a mixture of styrene and m-diisopropenylbenzene (molar ratio: 40:1) and 100 mg of azo-bis(isobutyronitrile), the mixture is homogenized for a further 30 minutes. It is then stirred for 16 hours and subsequently heated at 60°–70° C. for 24 hours. A stable aqueous polymer dispersion which is free from cationic surfactants and comprises polymer particles having an average particle size of 15 nm and a narrow particle size distribution (value for the standard deviation σ=3.09) is obtained.

I claim:

1. Process for the preparation of aqueous polymer dispersions comprising the steps of
   (1) first preparing an emulsion from
      (A) an emulsifier or a mixture of emulsifiers wherein the emulsifier is a mixture of
         (a1) a compound selected from the group consisting of naturally occurring, zwitterionic phosphatides and mixtures thereof; and
         (a2) a compound selected from the group consisting of cholic acid, salts of cholic acid, deoxycholic acid, salts of deoxycholic acid, ricinoleic acid, salts of ricinoleic acid, oleic acid, salts of oleic acid, and mixtures of these compounds;
      (B) a water-insoluble agent which forms free radicals or a mixture of water-insoluble agents which form free radicals
      (C) a monomer which can be polymerized by free radicals or a mixture of monomers which can be polymerized by free radicals and
      (D) water and
   (2) secondly polymerizing component (C).

2. Process according to claim 1, wherein component (A), is a mixture of (a1) 5 to 95% by weight of lecithin and (a2) 95 to 5% by weight of a compound selected from the group consisting of salts of cholic acid, salts of oleic acid, and mixtures thereof.

3. Process according to claim 1, wherein components (A) and (C) are employed in a weight ratio of 1:10 to 10:1.

4. Process according to claim 1 wherein components (A) and (C) are employed in a weight ratio of 1:3 to 5:1.

5. Process according to claim 1, further comprising the step of adding a substance selected from the group consisting of biologically active substances and mixtures thereof, in stage (1).

6. Aqueous polymer dispersions prepared according to the method of claim 1.

7. A coating composition comprising the aqueous polymer dispersion according to claim 6.

8. A pharmaceutical product comprising aqueous polymer dispersions according to claim 6.

9. Process according to claim 1, further comprising the step of adding a substance selected from the group consisting of biologically active substances and mixtures thereof, after stage (2) has been carried out.

10. A cosmetic product comprising aqueous polymer dispersions according to claim 6.

* * * * *